United States Patent
Campbell et al.

(10) Patent No.: US 7,331,229 B2
(45) Date of Patent: Feb. 19, 2008

(54) MAGNETIC NULL ACCELEROMETER

(75) Inventors: Ray F. Campbell, Newport Beach, CA (US); Joan D. Wada, Anaheim, CA (US); Michael J. Costello, Hermosa Beach, CA (US); Mohsen A. Khatiblou, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 10/905,007

(22) Filed: Dec. 9, 2004

(65) Prior Publication Data

US 2008/0011081 A1    Jan. 17, 2008

(51) Int. Cl.
*G01P 15/125* (2006.01)
(52) U.S. Cl. .............................. 73/514.32; 73/514.39; 73/514.17; 73/514.23
(58) Field of Classification Search ............ 73/514.17, 73/514.24, 514.32
See application file for complete search history.

(56) References Cited

U.S. PATENT DOCUMENTS

| | | | |
|---|---|---|---|
| 2,696,566 A | | 12/1954 | Lion |
| 2,711,590 A | | 6/1955 | Wilcox |
| 2,869,851 A | * | 1/1959 | Sedgfield et al. ......... 73/514.24 |
| 2,916,279 A | * | 12/1959 | Stanton .................... 73/514.32 |
| 3,090,239 A | * | 5/1963 | Dacus ...................... 73/514.17 |
| 3,186,101 A | | 6/1965 | Wolpert |
| 3,226,981 A | | 1/1966 | Mullins et al. |
| 3,290,786 A | | 12/1966 | Parkin |
| 3,417,626 A | | 12/1968 | Riordan |
| 3,508,445 A | * | 4/1970 | Gagnon et al. .......... 73/514.12 |
| 3,746,281 A | | 7/1973 | Stripling |
| 4,037,704 A | * | 7/1977 | Golobay et al. ....... 400/124.17 |
| 4,128,010 A | * | 12/1978 | Aske ........................... 73/497 |
| 4,145,929 A | * | 3/1979 | Aske ....................... 73/514.24 |
| 4,344,235 A | * | 8/1982 | Flanders .................. 33/366.12 |
| 4,470,562 A | | 9/1984 | Hall et al. |
| 4,507,737 A | | 3/1985 | LaSarge et al. |
| 4,515,013 A | * | 5/1985 | Hue ....................... 73/170.01 |
| 4,583,296 A | | 4/1986 | Dell'Acqua |
| 4,601,206 A | | 7/1986 | Watson |
| 4,792,676 A | | 12/1988 | Hojo et al. |
| 4,912,397 A | | 3/1990 | Gale et al. |
| 4,941,354 A | * | 7/1990 | Russell et al. ........... 73/514.24 |
| 4,987,779 A | | 1/1991 | McBrien |

(Continued)

FOREIGN PATENT DOCUMENTS

EP          585862 A1     3/1994

(Continued)

*Primary Examiner*—Hezron Williams
*Assistant Examiner*—Samir M. Shah
(74) *Attorney, Agent, or Firm*—Ostrager Chong Flaherty & Broitman P.C.

(57) ABSTRACT

An accelerometer system includes a capacitor plate fixed within a housing and a flexure plate positioned substantially parallel to the capacitor plate a distance therefrom. The distance varies in response to acceleration forces acting upon the flexure plate such that the flexure plate and the capacitor plate generate a capacitance signal. A magnet is coupled to the flexure plate and generates a magnetic field, which moves as the flexure plate flexes. A coil winding around the flexure plate generates a second magnetic field as a function of capacitance signal, thus opposing the flexure plate magnetic field, and thereby returning the flexure plate to a null position.

11 Claims, 2 Drawing Sheets

U.S. PATENT DOCUMENTS

| | | |
|---|---|---|
| 5,008,774 A | 4/1991 | Bullis et al. |
| 5,031,330 A | 7/1991 | Stuart |
| 5,079,847 A | 1/1992 | Swartz et al. |
| 5,124,938 A | 6/1992 | Algrain |
| 5,146,417 A | 9/1992 | Watson |
| 5,180,986 A | 1/1993 | Swartz et al. |
| 5,191,713 A | 3/1993 | Alger et al. |
| 5,283,528 A | 2/1994 | van Seeters |
| 5,325,065 A | 6/1994 | Bennett et al. |
| 5,383,363 A | 1/1995 | Kulmaczewski |
| 5,415,040 A | 5/1995 | Nottmeyer |
| 5,454,266 A | 10/1995 | Chevroulet et al. |
| 5,456,111 A | 10/1995 | Hulsing, II |
| 5,461,319 A | 10/1995 | Peters |
| 5,495,414 A | 2/1996 | Spangler et al. |
| 5,597,956 A | 1/1997 | Ito et al. |
| 5,774,996 A | 7/1998 | Ogawa et al. |
| 5,801,309 A | 9/1998 | Carr et al. |
| 5,801,313 A | 9/1998 | Horibata et al. |
| 5,831,164 A | 11/1998 | Reddi et al. |
| 5,861,754 A | 1/1999 | Ueno et al. |
| 5,905,203 A | 5/1999 | Flach et al. |
| 5,969,250 A | 10/1999 | Greiff |
| 5,986,497 A | 11/1999 | Tsugai |
| 6,128,955 A | 10/2000 | Mimura |
| 6,230,566 B1 | 5/2001 | Lee et al. |
| 6,293,148 B1 | 9/2001 | Wang et al. |
| 6,338,199 B1 | 1/2002 | Chigira et al. |
| 6,449,857 B1 | 9/2002 | Anikolenko |
| 6,467,346 B1 | 10/2002 | Challoner et al. |
| 6,609,037 B1 | 8/2003 | Bless et al. |
| 6,622,647 B2 | 9/2003 | DePoy |
| 6,662,654 B2 | 12/2003 | Miao et al. |
| 6,688,013 B2 | 2/2004 | Greway |
| 6,701,788 B2 | 3/2004 | Babala |
| 6,731,121 B1 | 5/2004 | Hsu et al. |
| 6,776,043 B1 | 8/2004 | Campbell et al. |
| 6,785,975 B1 | 9/2004 | Campbell et al. |
| 6,810,739 B1 | 11/2004 | Campbell et al. |
| 6,865,946 B2 * | 3/2005 | Campbell ................ 73/514.32 |
| 2002/0005297 A1 | 1/2002 | Alft et al. |
| 2002/0190607 A1 | 12/2002 | Padden et al. |
| 2003/0079543 A1 | 5/2003 | Potter |

FOREIGN PATENT DOCUMENTS

| | | |
|---|---|---|
| JP | 06082469 A | 3/1994 |

\* cited by examiner ated from the second distance change; and a second oscillator signal is generated in response to thereto. A difference of the first oscillator signal and the second oscillator signal is generated and converted from a digital signal to an analog signal proportional to position error of the flexure plate. A nearly uniform magnetic force within the coil is generated as a function of the analog signal for opposing a magnetized field generated through the magnet, and the flexure plate is thereby returned to a null condition. A measurement of the nearly uniform magnetic force is generated and converted to an output voltage signal representative of acceleration.

MAGNETIC NULL ACCELEROMETER

TECHNICAL FIELD

The present invention relates generally to accelerometers, and more particularly, to a magnetic null accelerometer for an accelerating device.

Current systems, such as missiles, spacecraft, airplanes and automobiles, include inertial regulating systems or inertial measurement units for orienting the systems relative to the earth. Many inertial measurement units include accelerometers, such as capacitive accelerometers, for determining system inertia. It is well known that capacitive accelerometers measure the acceleration, vibration and the inclination of objects to which they are attached. In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

As was mentioned, this type of accelerometer can be used in aerospace inertial measurement units or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult process.

Additionally, missile systems require a high degree of accuracy regarding angular and linear acceleration measurements. Improvements in this regard are constantly being sought out.

The disadvantages associated with current accelerometer systems have made it apparent that a new accelerometer system is needed. The new accelerometer system should substantially minimize temperature sensing requirements and should also improve acceleration detection accuracy. The present invention is directed to these ends.

SUMMARY OF THE INVENTION

In accordance with one aspect of the present invention, an accelerometer system includes a capacitor plate fixed within a housing and a flexure plate positioned substantially parallel to the capacitor plate a distance therefrom. The distance varies in response to acceleration forces acting upon the flexure plate such that the flexure plate and the capacitor plate generate a capacitance signal. A magnet is coupled to the flexure plate and generates a magnetic field, which moves as the flexure plate flexes. A coil winding around the flexure plate generates a second magnetic field as a function of capacitance signal, thus opposing the flexure plate magnetic field, and thereby returning the flexure plate to a null position.

In accordance with another embodiment of the present invention, a method for operating an accelerometer, including a flexure plate surrounded by a conductive coil and having a magnet coupled thereto and further having two parallel capacitor plates, includes accelerating the flexure plate. This acceleration causes a first distance between the flexure plate and a first capacitor plate to change, thereby causing a second distance between the flexure plate and a second capacitor plate to change. The method further includes generating a first variable capacitor signal as a function of the first distance change, and generating a first oscillator signal in response to the first variable capacitor signal. Further, a second variable capacitor signal is generated from the second distance change; and a second oscillator signal is generated in response to thereto. A difference of the first oscillator signal and the second oscillator signal is generated and converted from a digital signal to an analog signal proportional to position error of the flexure plate. A nearly uniform magnetic force within the coil is generated as a function of the analog signal for opposing a magnetized field generated through the magnet, and the flexure plate is thereby returned to a null condition. A measurement of the nearly uniform magnetic force is generated and converted to an output voltage signal representative of acceleration.

One advantage of the present invention is that it generates a dynamic range and granularity sufficient for Inter-Continental Ballistic Missile (ICBM) usage. Moreover, the accelerometer consumes less power than current accelerometers, while dramatically improving reliability.

The inertial measurement unit system generates reliable angular and linear acceleration measurements. These measurements are accurate to the degree required by missile systems and will therefore provide a dramatic improvement in reliability and manufacturing costs.

Another advantage is that it is not substantially affected by changes in temperature or temperature gradients. The flexure configuration reduces the temperature sensitivity, thereby enhancing the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to an accelerometer system 10, particularly suited to the aerospace field. The present invention is, however, applicable to various other uses that may require accelerometers, such as any system requiring position and velocity measurements under extreme conditions, as will be understood by one skilled in the art.

Figure 1:
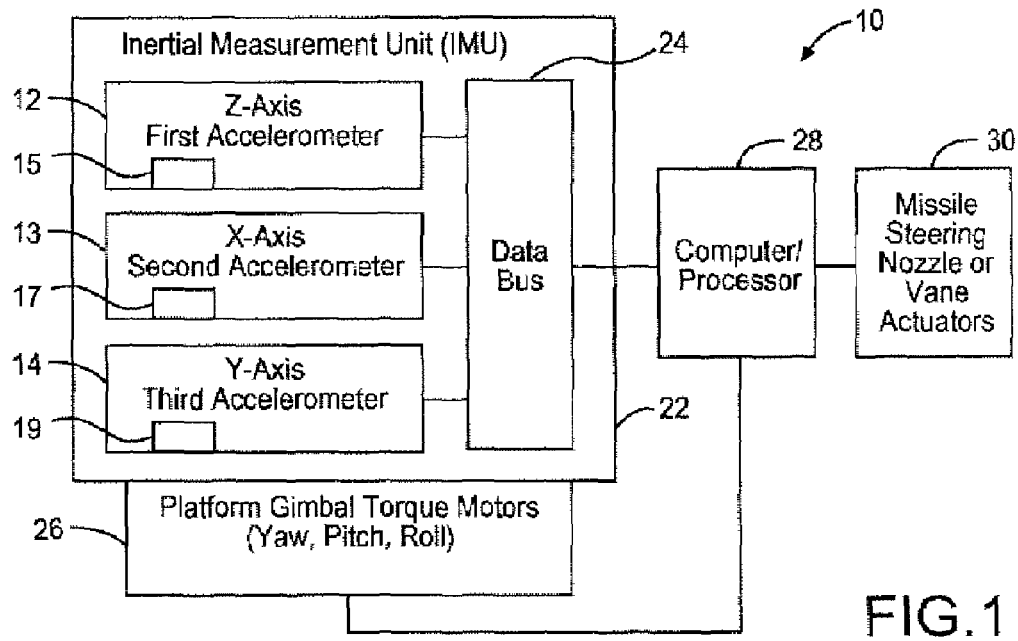
FIG. 1 illustrates an aerospace system including an accelerometer system in accordance with one embodiment of the present invention.

Referring to FIG. 1, the system 10, which is an aerospace, accelerometer system, includes an inertial measurement unit 22 having three accelerometer gimbals/axes 12, 13, 14 (first, second, and third) respectively. Each of the gimbals includes magnetic null accelerometers 15, 17, 19, which will be discussed in detail later. The aerospace system 10 is merely an illustrative example of an accelerating object and is not meant to be limiting. For example, the present inertial measurement unit 22 could be implemented in any accelerating object to sense acceleration forces, including any type of vehicle or missile system, such as a Minuteman III missile system or a tactical missile system.

Further, the system 10 may include any of the following flexure plate devices: a flexured plate dual capacitance accelerometer, a variable capacitance bridge accelerometer, a capacitance acceleration derivative detector, a dual flexure plate angular accelerometer, a single plate capacitive acceleration derivative detector, a dual bridge flexure plate angular accelerometer, an angular and linear flexured plate accelerometer, a dual bridge angular and linear accelerometer, an accelerometer augmented leveling device, an accelerometer augmented compass, a quad flexured plate level detector, a flexured plate capacitive compass, a capacitive balance leveling device, an integrated capacitive bridge inertial measurement unit, an integrated flexure functions inertial measurement unit, and an extended accuracy flexured plate dual capacitance accelerometer. All of the aforementioned devices may include the magnetic null accelerometer system of the present invention described in detail regarding FIG. 2.

The illustrated aerospace system 10 includes the previously mentioned inertial measurement unit 22 and a data bus 24 and further includes gimbal and torque motors 26, a computer or processor 28, and missile steering nozzle or vane actuators 30.

The inertial measurement unit accelerometer gimbals 12, 13, 14 defining the z-, x-, and y-axes are coupled to the platform (including gimbal and torque motors 26 (yaw, pitch and roll motors)). The magnetic null accelerometer gimbals 12, 13, 14 are also coupled to the data bus 24, which transfers information to the computer/processor 28. The processor 28 is coupled to the missile steering nozzle (or vane actuators) unit 30 and the gimbal torque motors 26.

All accelerometers are assumed to be on an inertial platform 26 utilizing generated signals to maintain an essentially zero rotation about all three axes. This control will be provided by the processor 28, which can compute signals and drive the motors on the platform 26 and select the required mode and provide the output data required by the system 10. The platform 26 may be a gimbal or alternate inertial platform design known in the art. The system 10 utilizes the generated signals from the magnetic null accelerometers to control the platform position to maintain a near zero rotation. The platform 26 may also include gimbal torque motors controlling the yaw, pitch, and roll gimbals, z-, x-, and y-axis gimbals 12, 13, 14.

In one embodiment of the present invention, such as when the system 10 includes a leveling device, each axis gimbal 12, 13, 14 may include multiple accelerometers and an angular readout device to detect the current angular position with respect to the platform 26. The angular readout device may be an electrical resolver, an optical encoder, a mechanical interface or any of a wide range of devices capable of determining the angle to the accuracy required by the system 10.

The platform 26 may also include, mounted as an integral part, a gyrocompass, which will generate an output indicating the magnitude of the velocity vector through the xz-plane. When the plane of the platform 26 is level and local gravity is perpendicular thereto, the gyrocompass may be rotated 360° in order to establish the east-west direction of the rotation of the earth. This reference may be utilized for initial conditions for inertial measurement unit gimbal readouts.

Figure 2:
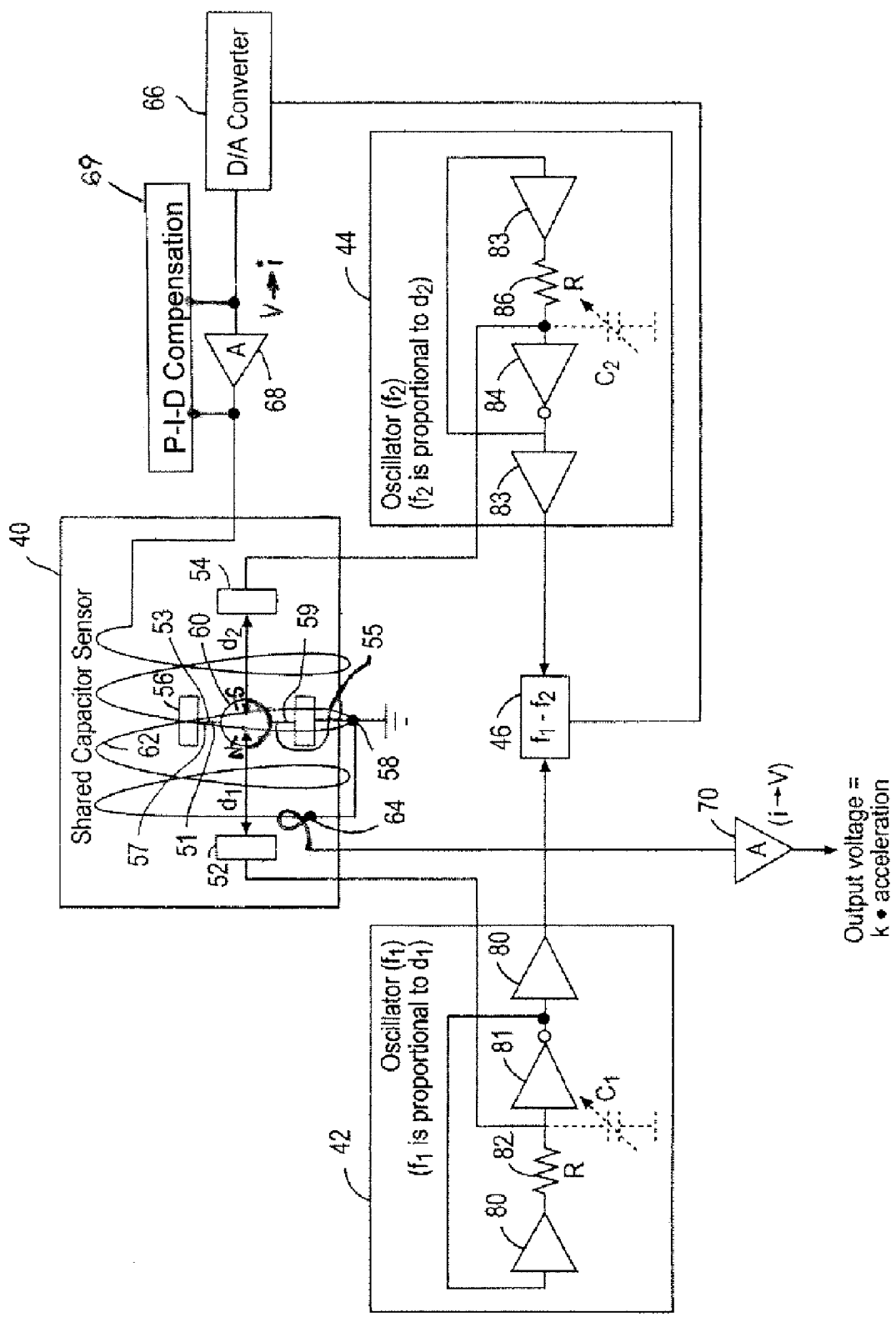
FIG. 2 illustrates an accelerometer system of FIG. 1 in accordance with another embodiment of the present invention.

Referring to FIG. 2, an example of a possible configuration for the magnetic null accelerometer 15 is included as an illustrative example of the three magnetic null accelerometers 15, 17, 19. The magnetic null accelerometer 15 is part of an inertial measurement unit 22 (IMU), as was previously discussed. The magnetic null accelerometer 15 includes a shared capacitor sensor 40 including a first capacitor plate (first plate), a second capacitor plate (second plate), and a flexure plate 55 (magnetized flexure plate or flexure plate having a magnet coupled thereto) positioned between the first and second plates and having a magnet 60 coupled thereto. To maintain the capacitances between the flexure plate 55 and to maintain the first and second plates insensitive to changes in temperature, a constant ratio A/d is maintained where A is the area of the plates and d is separation between the flexure plate 55 and either the first or second plate.

The magnetic null accelerometer 15 further includes an external current controlled coil 62 for inducing a magnetic field opposing the magnetic field of the magnet 60, a current sensor 64 detecting the controlled current generated as a function of the current controlled coil 62 magnetic field, two oscillators 42, 44, a frequency subtraction device 46, a D/A converter 66, an compensated amplifier 68, and a current-to-voltage amplifier 70.

The shared capacitor sensor 40 includes a single flexure plate 55 having a magnet 60 mounted thereon as, for example, a proof mass, two parallel capacitor plates 52, 54, and a metal housing structure 56. The shared capacitor sensor 40 generates capacitance signals in response to acceleration of the aeronautical system 10, as will be discussed later.

The magnet 60 includes any magnet type known in the art and may be coupled to the flexure plate 55 through any known method. The magnet 60 may act as a proof mass or may be flexible and act as a flexure plate.

The magnetic field generated by the coil winding 62, generates a nearly uniform magnetic force within the coil 62 to oppose the permanently magnetized flexible plate field of the magnet 60. This force is used to bring the plate 55 back to its origin, i.e., to "null" the specific force of acceleration experienced by the flex plate 55, by opposing the permanent magnet field and thereby restoring its position at rest. By calibrating the current required to compensate or "null" the specific force, a measurement of this specific force is obtained.

The capacitance measuring circuit (i.e. oscillators 42, 44 and frequency subtracter 46) is used as an indicator of the offset of the flex plate 55 from its null or flexure position. This measurement of the offset or "error" signal is used to modify the current supplied to the coil windings 62 changing the magnetic force until the capacitance circuit indicates a null or flexureized position for the flex plate 55. When the plate 55 is returned from the offset to the null position, the total specific force of acceleration plus gravity can be determined from current measurement, which is detected by the current sensor 64.

The dual capacitance accelerometer detects the null position error by outputting the difference between the two oscillators 42, 44 (f1 and f2). This digital difference, from the frequency subtraction device 46, is received in a D/A converter 66 (Digital/Analog), which converts the digital frequency difference into an analog voltage proportional to the position error of the flexure plate 55. This proportional voltage signal controls the compensated amplifier 68, which is compensated through the proportional/integral differential signal (P-I-D) compensation block 69. The P-I-D compensation block 69 includes the stability elements, which assure controlled performance and appropriate combination of proportional/integral differential signal components. The compensated amplifier 68 is compensated, in one embodiment of the present invention, for overall loop performance. The signal from the compensated amplifier drives the magnetizing coil 62 in a direction opposing the polarity of the flexure plate magnet. The result drives the flexure plate 55 back to the null position.

The current required to drive the plate 55 to the null condition is detected by a current sensor 64, which converts the current to an analog voltage proportional to the force required to return to null. The signals from the current sensor 64 are received in the current-to-voltage amplifier 70, which generates an output voltage signal (acceleration signal multiplied by a constant (k)).

The flexure plate 55, including the magnet 60, includes a first side 51, a second side 53 and a common edge 57. The flexure plate 55 is positioned between the two capacitor plates 52, 54 such that the first fixed plate 52 is a first distance ($d_1$) from a first side 51, and the second capacitor plate 54 is a second distance ($d_2$) from a second side 53 of the flexure plate 55. The flexure plate 55 is affixed to the metal housing structure 56 through at least a portion of at least one edge 57 of the flexure plate 55, which is coupled to both ends of the flexure plate 55 and is also coupled to a ground 58. The present invention, however, includes the flexure plate 55 coupled at two edges 57, 59 for a square embodiment of the plate 55. Numerous other attachment points are included as alternate embodiments, as will be understood by one skilled in the art.

In the present embodiment, the flexure plate 55 is circular and coupled to the housing 56 through only one edge 57. However, numerous other shapes and points of connection are included, as will be understood by one skilled in the art. The flexure plate 55 is rigidly fixed to the metal housing structure 56 through almost any manner known in the art. Resultantly, all the system flexure is generated within the flexure plate 55. The connection arrangement generally increases reliability and robustness of the system 10.

A gas, vacuum, or liquid environment is enclosed within the sensor 40 through the metal housing structure 56 such that there is no interference with the movement of the flexure plate 55 other than the acceleration of the system 10 along a perpendicular axis. During acceleration, the flexure plate 55 flexes according to the reaction force of Newton's second law of motion, force=mass×acceleration (F=ma), causing the distance between the flexure plate 55 and the capacitor plates 52, 54 to vary, thus creating the two variable capacitors, one on each side of the flexure plate 55.

The combination of the first capacitor plate 52 and the flexure plate 55 forms a first parallel plate capacitor, and the combination of the second capacitor plate 54 and the flexure plate 55 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $$C \cong (\epsilon_0 A)/d.$$

where $\epsilon_0$ is the permittivity constant, A is the area of a capacitor plate 52 or 54 (if I is the length of one side and the cross section of the plate is square, then A=I2) and d is the effective distance between the flexure plate 55 and one of the capacitor plates 52, 54.

The first capacitor plate 52 is coupled to the metal housing structure 56 and positioned a first distance (d1) from the flexure plate 55. The first capacitor plate 52 and the flexure plate 55 form a first capacitor whose operation is also governed by the equation $$C \cong (\epsilon_0 A)/d.$$

The capacitance of the first capacitor plate 52 responds to movement of the flexure plate 55 when d1 either increases or decreases, thereby generating a first capacitance signal.

The second capacitor plate 54 is also coupled to the metal housing structure 56 and positioned a first distance (d1) from the flexure plate 55. The second capacitor plate 54 and the flexure plate 55 form a second capacitor whose operation is governed by the equation $$C \cong (\epsilon_0 A)/d.$$

The second capacitor plate 54 responds to movement of the flexure plate 55 when d2 either increases or decreases, thereby generating a second capacitance signal.

The distances ($d_1$ and $d_2$) between the flexure plate 55 and the capacitor plates 52, 54 are a function of acceleration and are proportional or equal when the system 10 is at rest. Each capacitor plate 52, 54 is connected to a respective oscillator 42, 44, which generates the capacitance necessary for predictable oscillation.

The first capacitor plate 52 is coupled to the first oscillator 42, and the second capacitor plate 54 is coupled to the second oscillator 44. The two oscillators 42, 44 are coupled to a frequency subtraction device 46, and the frequency subtraction device 46 is coupled to a current-to-voltage amplifier 70, which is coupled to a processor 28 (missile operations processor). The processor 28 is coupled to an actuator 30, and to various system components, as well as thrusters and attitude control devices.

The oscillators 42, 44 are ideally precision designs utilizing GaAs or similar material. The oscillators 42, 44 are also mounted on the metal housing structure 56 in the present embodiment.

The embodied first oscillator 42 includes components well known in the art. Although the embodied oscillator is a common oscillator type, one skilled in the art will realize that numerous other types of oscillators will also be adaptable for the present invention. The various components include, but are not limited to, two buffers 80, an inverter 81, and at least one resistor 82. The first oscillator 42 receives the capacitance signal from the first capacitor plate 52 and generates therefrom a frequency signal ($f_1$), which is inversely proportional to $d_1$.

The second oscillator 44 receives the capacitance signal from the second capacitor plate capacitor and generates therefrom a second frequency signal ($f_2$), which is inversely proportional to $d_2$. The embodied oscillator 44 is similar to the first oscillator 42 and also includes a set of buffers 83, an inverter 84, and at least one resistor 86.

The frequencies ($f_1$ and $f_2$) are functions of the distances ($d_1$ and $d_2$) respectively. As the flexure plate 55 flexes, one capacitor increases and the other decreases, thereby causing one oscillator 42 to increase output frequency and the other oscillator 44 to decrease output frequency.

The frequency subtraction device 46 receives the oscillator signals ($f_1$ and $f_2$) and generates the difference thereof, i.e., $f_1$-$f_2$. Important to note is that the polarities of both $f_1$ and $f_2$ are determined before this difference is calculated. As mentioned, the resultant frequency signal is generated from the frequency subtraction device 46.

The processor 28 receives the output signals and generates a processor signal and response thereto. The processor 28 is embodied as a typical missile or airplane processor, as is familiar in the art.

The processor 28 accepts the output of each accelerometer pair and applies the compensation and calibration corrections derived from manufacturing and the earth rate calibration scheme. The actuator, here embodied as missile steering nozzle or vane actuators 30 receives processor signals and activates system components (e.g., object control devices) in response thereto. System components include for example, thrusters or attitude control devices.

The processor 28 receives the acceleration signal multiplied by the constant and generates a computer signal and response thereto. The processor 28 is embodied as a typical missile or airplane computer, as is familiar in the art.

The missile steering nozzle or vane actuators 30 receive the computer signal and activate the gimbal torque motors 26 or object control devices in response thereto.

Figure 3:
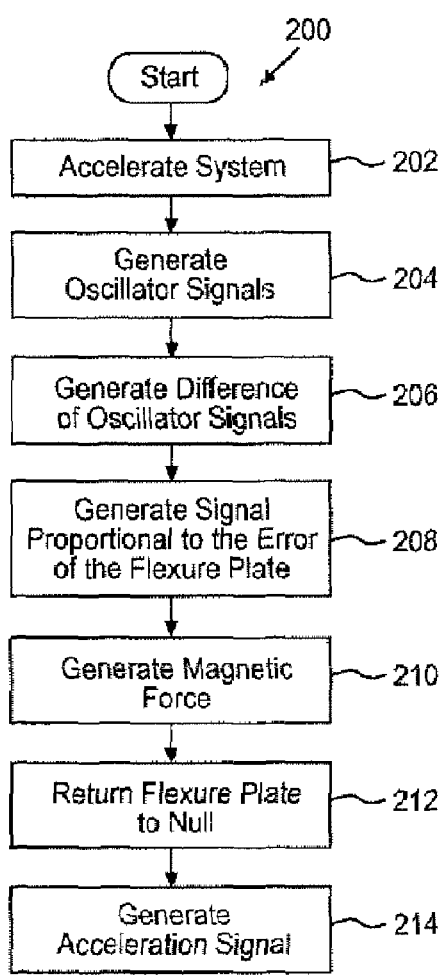
FIG. 3 illustrates a logic flow diagram of a magnetic null accelerometer in operation.

Referring to FIG. 3, a logic flow diagram 200 of the acceleration system 10 in operation is illustrated in accordance with another embodiment of the present invention. Logic starts in operation block 202, where the flexure plate having the magnet coupled thereto accelerates, thereby causing the first distance between the flexure plate and the first capacitor plate to change and thereby causing the second distance between the flexure plate and the second capacitor plate to change. This further causes the magnetic field of the magnet to move relative to the motion of the flexure plate.

In operation block 204, the first variable capacitor signal is generated from the acceleration; and the first oscillator signal is generated as a function of the first variable capacitor signal. Further the second variable capacitor signal is generated from the acceleration, and the second oscillator signal is generated as a function of the second variable capacitor signal.

In operation block 206, the difference of the first oscillator signal and the second oscillator signal is generated.

In operation block 208, the difference of the first oscillator signal and the second oscillator signal is converted from a digital signal to an analog signal proportional to position error of the flexure plate.

In operation block 210, a nearly uniform magnetic force is generated within the coil as a function of the analog signal for opposing a magnetized field generated through the magnet.

In operation block 212 the flexure plate is returned to a null condition as a function of the nearly uniform magnetic force opposing the magnetized flexible plate field.

In operation block 214, the measurement of the nearly uniform magnetic force is generated and converted to an output voltage signal equal to system acceleration.

In operation, a method for operating a flexure plate accelerometer including a flexure plate and two parallel capacitor plates, wherein a magnet is coupled to the flexure plate and a conductive coil surrounds the flexure plate includes accelerating the flexure plate, thereby causing a first distance between the flexure plate and a first capacitor plate to change and thereby causing a second distance between the flexure plate and a second capacitor plate to change. The method further includes generating a first variable capacitor signal; generating a first oscillator signal in response to the first variable capacitor signal; generating a second variable capacitor signal; generating a second oscillator signal in response to the second variable capacitor signal; generating a difference of the first oscillator signal and the second oscillator signal; converting the difference of the first oscillator signal and the second oscillator signal from a digital signal to an analog signal proportional to position error of the flexure plate; generating a nearly uniform magnetic force within the coil as a function of the analog signal for opposing a magnetized field generated through the magnet; returning the flexure plate to a null condition as a function of the nearly uniform magnetic force opposing the magnetized flexible plate field; generating a measurement of the nearly uniform magnetic force; and converting the measurement of the nearly uniform magnetic force to an output voltage signal representative of acceleration.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A magnetic null accelerometer comprising:

first and second capacitor plates arranged in parallel spaced apart a given distance from each other;

a flexure plate mounted in between said first and second capacitor plates and capable of flexing in response to acceleration forces applied thereon, said flexure plate having a first side facing said first capacitor plate for forming a first capacitor generating a first capacitance signal based on its distance from said first capacitor plate, and having a second side facing said second capacitor plate for forming a second capacitor generating a second capacitance signal based on its distance from said second capacitor plate, and said flexure plate having a null position between said first and second capacitor plates at which the first and second capacitance signals are equal;

a capacitance measuring circuit for measuring the first and second capacitance signals and detecting a difference between them as an indicator of offset of said flexure plate from its null position to a flexed position under acceleration forces;

a magnet coupled to said flexure plate between said first and second capacitor plates, and a current-controlled coil having a single windings receiving a single control current for generating a magnetic force opposing the magnetic field of the magnet when said flexure plate is in a flexed position so as to restore said flexure plate to its null position; and a compensation circuit for generating a single control current in response to the difference between the first and second capacitance signals measured by said capacitance measuring circuit and for applying the corresponding single control current to said coil so as to restore said flexure plate to its null position.

2. A magnetic null accelerometer according to claim 1, wherein said capacitance measuring circuit includes a first oscillator for generating a first frequency signal proportional to the first capacitance signal, a second oscillator for generating a second frequency signal proportional to the second capacitance signal, and a frequency subtractor for generating a frequency difference signal as an indicator of offset of said flexure plate to a flexed position under acceleration forces.

3. A magnetic null accelerometer according to claim 2, further comprising a digital-to-analog converter for converting the frequency difference signal generated by said capacitance measuring circuit into an analog voltage proportional to the offset of said flexure plate at the flexed position, and wherein said compensation circuit compensation circuit generates the corresponding single control current in response to the analog voltage to drive said coil so as to restore said flexure plate to its null position.

4. A magnetic null accelerometer according to claim 1, further comprising a current sensor which detects the single control current used to drive said coil and generates an output signal proportional to the force required to restore said flexure plate to its null position as an indicator of the acceleration forces applied to said flexure plate.

5. A magnetic null accelerometer control circuit comprising:
a first capacitor plate spaced apart a distance from a flexure plate which is capable of flexing in response to acceleration forces applied thereon, said flexure plate having a first side facing said first capacitor and forming a first capacitor for generating a first capacitance signal based on its distance from said first capacitor plate, and said flexure plate having a null position relative to said first capacitor plate;
a capacitance measuring circuit for measuring the first capacitance signal and detecting a difference indicator of offset of said flexure plate from its null position to a flexed position under acceleration forces;
a magnet coupled to said flexure plate, and a current-controlled coil having a single windings receiving a single control current for generating a magnetic force opposing the magnetic field of the magnet when said flexure plate is in a flexed position so as to restore said flexure plate to its null position; and
a compensation circuit for generating a single control current in response to the difference indicator measured by said capacitance measuring circuit and for applying a the corresponding single control current to said coil so as to restore said flexure plate to its null position.

6. A magnetic null accelerometer according to claim 5, further comprising a second capacitor plate spaced apart in parallel a given distance from said first capacitor plate with said flexure plate between them, said flexure plate having a second side facing said second capacitor plate for forming a second capacitor therewith generating a second capacitance signal based on its distance from said second capacitor plate, wherein said capacitance measuring circuit measures the first and second capacitance signals and detects a difference between them as an indicator of offset of said flexure plate from its null position to a flexed position under acceleration forces.

7. A magnetic null accelerometer according to claim 6, wherein said capacitance measuring circuit includes a first oscillator for generating a first frequency signal proportional to the first capacitance, a second oscillator for generating a second frequency signal proportional to the second capacitance, and a frequency subtractor for generating a frequency difference signal as an indicator of offset of said flexure plate from its null position to a flexed position under acceleration forces.

8. A magnetic null accelerometer according to claim 7, further comprising a digital-to-analog converter for converting the frequency difference signal generated by said capacitance measuring circuit into an analog voltage proportional to the offset of said flexure plate at the flexed position, and wherein said compensation circuit compensation circuit generates the single control current in response to the analog voltage to drive said coil so as to restore said flexure plate to its null position.

9. A magnetic null accelerometer according to claim 5, further comprising a current sensor which detects the single control current used to drive said coil and generates an output signal proportional to the force required to restore said flexure plate to its null position as an indicator of the acceleration forces applied to said flexure plate.

10. A method for operating a flexure plate accelerometer comprising:
providing a first capacitor plate spaced apart a distance from a flexure plate which is capable of flexing in response to acceleration forces applied thereon,
providing a first side of the flexure plate facing the first capacitor plate and forming a first capacitor therewith for generating a first capacitance signal based on its distance from the first capacitor plate, wherein the flexure plate has a null position relative to the first capacitor plate;
measuring the first capacitance signal and detecting a difference indicator of offset of the flexure plate from its null position to a flexed position under acceleration forces;
providing a magnet that is coupled to the flexure plate, and a current-controlled coil having a single windings receiving a single control current for generating a magnetic force opposing the magnetic field of the magnet when the flexure plate is in a flexed position so as to restore the flexure plate to its null position; and
generating a single control current in response to the difference indicator measured as an offset of the flexure plate from its null position to a flexed position under acceleration forces, and applying it to the coil to drive the magnet so as to restore the flexure plate to its null position.

11. A method for operating a flexure plate accelerometer according to claim 10, further comprising providing a second capacitor plate spaced apart in parallel a given distance from the first capacitor plate with the flexure plate between them, and providing the flexure plate with a second side facing the second capacitor plate and forming a second capacitor therewith for generating a second capacitance signal based on its distance from the second capacitor plate, and measuring the first and second capacitance signals to detect a difference between them as an indicator of offset of the flexure plate from its null position to a flexed position under acceleration forces.

* * * * *